United States Patent [19]

Kaufman

[11] Patent Number: 4,494,286
[45] Date of Patent: Jan. 22, 1985

[54] CONNECTING ROD ARRANGEMENT

[75] Inventor: Vernon R. Kaufman, Cedarburg, Wis.

[73] Assignee: Tecumseh Products Company, Tecumseh, Mich.

[21] Appl. No.: 437,363

[22] Filed: Oct. 25, 1982

[51] Int. Cl.³ .............................................. B23P 15/10
[52] U.S. Cl. .................................. 29/156.5 A; 29/423; 29/432.2; 29/434; 29/525; 29/527.6; 29/557; 29/DIG. 5; 29/DIG. 10; 74/579 E; 123/197 AC; 384/457
[58] Field of Search .............. 29/156.5 R, 156.5 A, 29/432, 432.2, 434, 525, 527.5, 527.6, 557, DIG. 10, DIG. 5, 156.4 R, 423; 74/579 E, 595; 164/100; 123/197 AB, 197 AC; 308/179, 207 R, 216

[56] References Cited

U.S. PATENT DOCUMENTS

| | | | |
|---|---|---|---|
| 1,647,851 | 11/1927 | Bentley | 74/579 E X |
| 1,735,707 | 11/1929 | Worden | 308/179 |
| 1,773,301 | 8/1930 | Canfield | 74/579 E X |
| 1,831,325 | 11/1931 | Short | 74/579 E X |
| 1,948,176 | 2/1954 | Hopkins et al. | 74/579 E X |
| 2,695,204 | 11/1954 | Matera | 308/179 |
| 3,164,423 | 1/1965 | Hatz, Jr. et al. | 308/179 X |
| 3,241,896 | 3/1966 | Pinkerton | 384/294 |
| 3,279,267 | 10/1966 | Ernest et al. | 29/156.4 R |
| 3,581,599 | 6/1971 | Lee et al. | 74/603 |
| 3,906,603 | 9/1975 | Romer | 29/156.4 R |
| 4,178,140 | 12/1979 | Tankard | 29/156.5 A X |
| 4,191,238 | 3/1980 | Pichl | 164/100 |
| 4,406,590 | 9/1983 | Kessler | 29/156.5 A X |

FOREIGN PATENT DOCUMENTS

| | | | |
|---|---|---|---|
| 1136689 | 11/1982 | Canada . | |
| 2908782 | 9/1980 | Fed. Rep. of Germany . | |
| 100414 | 7/1980 | Japan | 29/156.5 A |
| 165146 | 10/1982 | Japan | 29/156.5 A |
| 1537327 | 3/1976 | United Kingdom . | |
| 1587653 | 4/1981 | United Kingdom . | |

Primary Examiner—Charlie T. Moon
Assistant Examiner—Ronald S. Wallace
Attorney, Agent, or Firm—Albert L. Jeffers; John F. Hoffman

[57] ABSTRACT

Techniques for forming one piece connecting rods for coupling a piston and crankshaft to convert between reciprocating and rotary motion as might be used in an internal combustion engine or piston-type compressor are disclosed wherein the connecting rod is formed of a lightweight material such as aluminum, which material is of an inadequate hardness to form a roller bearing race. The rod includes an elongated arm portion having enlarged annular portions at opposite ends thereof and with one of those annular portions having an inner surface for receiving, in a press fit manner, a hardened steel liner to provide an outer bearing race. Rollers are then interposed between this outer race and an eccentric portion of a crankshaft while the other enlarged annular portion receives a roller bearing assembly for connection to a piston wrist pin. The annular portion for surrounding the crankshaft is of about twice the diameter of the annular portion surrounding the piston wrist pin and the steel liner which is interposed between the larger annular portion and the crankshaft rollers is a relatively thin walled annular member with cylindrical inner and outer surfaces.

5 Claims, 2 Drawing Figures

CONNECTING ROD ARRANGEMENT

BACKGROUND OF THE INVENTION

The present invention relates generally to connecting rods for coupling crankshafts and pistons and to the techniques for fabricating and assembling such arrangements and more particularly to an improvement in connecting rods of reduced mass and cost.

Connecting rods for coupling pistons and crankshafts may be broadly categorized in two types. The first type referred to herein as a split ring connecting rod is more sophisticated and expensive and may be formed from a wide variety of materials with the ring or portion thereof which surrounds the crankshaft being formed as two split C-shaped halves each containing an inner bearing surface and boltable together, often with shims, in position about the crankshaft. The second type referred to herein as a one piece connecting rod includes an elongated arm portion with enlarged annular portions at the opposite ends thereof and is assembled by passing one of those annular portions over an end of a crankshaft and along the crankshaft into approximate final position with rollers being inserted intermediate the crankshaft and annular portion whereupon the crankshaft is repositioned somewhat to trap the rollers between the annular portion and the crankshaft. The present invention applies exclusively to this second type connecting rod.

Connecting rods of the second type have heretofore exclusively been formed from a steel stamping or forging hardened by a carborizing process and having the inner annular surface which forms the outer crankshaft bearing race ground to form a good bearing surface. Two undesirable features of such known connecting rods of the second type are their expense and their undesirably high mass.

Devices which convert between rotary crankshaft motion and reciprocating piston motion, such as internal combustion engines, compressors, steam engines, and the like, vibrate or shake due to the inertial effects of the internal moving parts. Typically, these inertial effects are only partially counterbalanced with the net result that the vibrations experienced by such machines during operations are determined by the masses of the several internal moving parts with greater mass resulting in greater vibration. Reduction in the mass of a given moving part within such devices may also allow a reduction in counterweight or counterbalancing masses yielding overall vibration reduction which is substantially greater than that due to the reduction in mass of the moving part per se. Thus, a small reduction in mass may result in a substantial reduction in device vibrations.

SUMMARY OF THE INVENTION

Among the several objects of the present invention may be noted the reduction in cost of small internal combustion engines; the reduction of vibration in small internal combustion engines; the reduction of the overall mass of a small internal combustion engine; the simplification of the manufacture of a small internal combustion engine; the reduction in both rotating and reciprocating masses associated with the internal parts of a small internal combustion engine; and the several above-noted objects in similar environments involving conversion between the reciprocating motion of a piston and rotary motion of a crankshaft such as larger or multiple cylinder internal combustion engines compressors, steam engines and the like. These as well as other objects and advantageous features of the present invention will be in part apparent and in part pointed out hereinafter.

In general, a connecting rod is fabricated and assembled to couple a crankshaft and piston by casting an aluminum connecting rod blank with openings near opposite ends thereof, reaming or boring one of those openings to a preferred size to receive a cold formed (stamped) and hardened steel sleeve in a press fit manner, passing the rod and sleeve over a crankshaft and interposing rollers between the sleeve and crankshaft. Typically the rollers are interposed while the sleeve and crankshaft are separated whereupon proper positioning of the crankshaft and sleeve traps the rollers therebetween.

BRIEF DESCRIPTION OF THE DRAWINGS

Corresponding reference characters indicate corresponding parts throughout the several views of the drawing.

Figure 1:
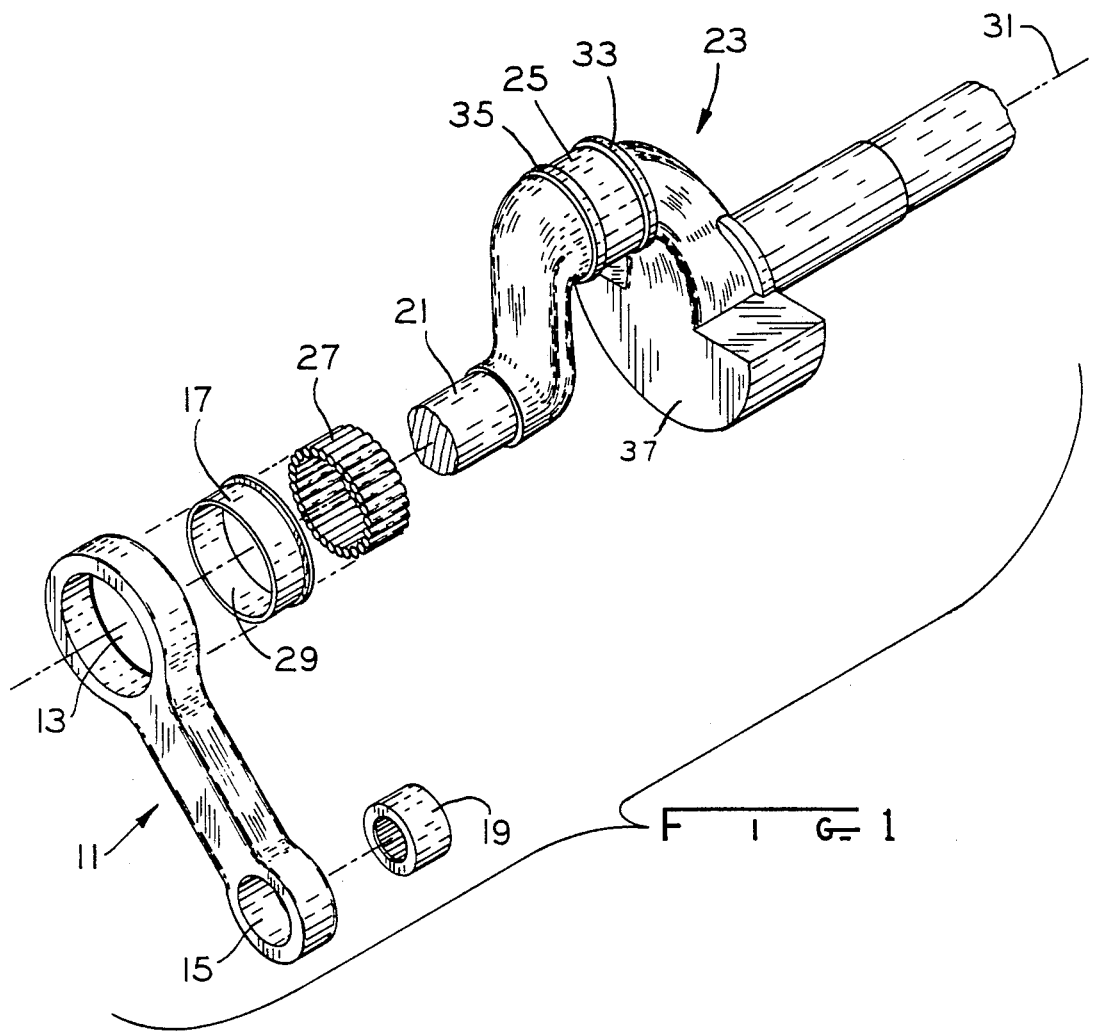
FIG. 1 is an expanded perspective view of a connecting rod and crankshaft assembly according to the present invention.
Figure 2:
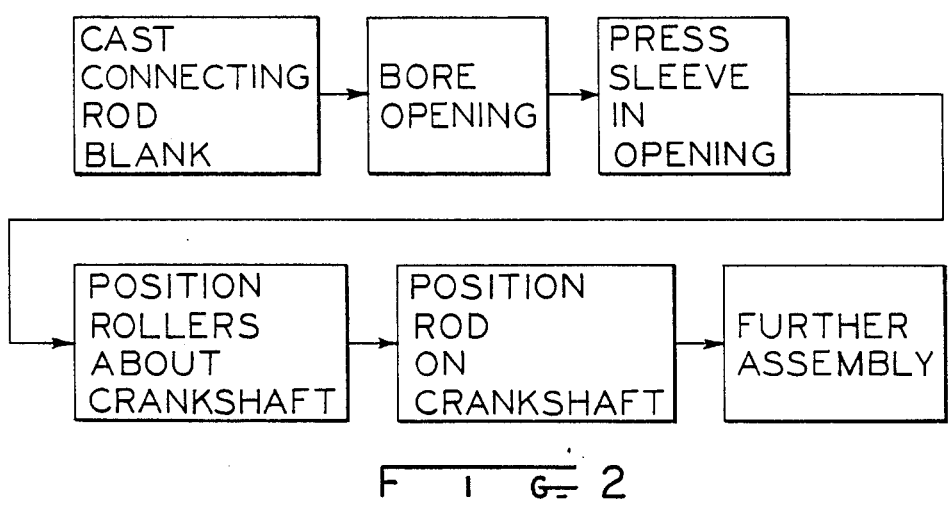
FIG. 2 is an exemplary block diagram illustrating steps in the process of fabricating and assembling a connecting rod for coupling a crankshaft and piston.

The exemplifications set out herein illustrate a preferred embodiment of the invention in one form thereof in a small internal combustion engine environment and such exemplifications are not to be construed as limiting the scope of the disclosure or the scope of the invention in any manner.

DESCRIPTION OF THE PREFERRED EMBODIMENT

Referring to the drawing generally, a connecting rod 11 is first cast of aluminum or similar material of a lightweight nature and of inadequate hardness to form a roller bearing race with the connecting rod blank having openings 13 and 15 near opposite ends thereof. The opening 13 is then reamed or bored to a preferred internal diameter and steel sleeve 17 is press fit within the opening 13. A roller or sleeve bearing assembly 19 may be positioned within the opening 15. A series of rollers 27 is then positioned about the inner bearing race portion 25 as by wax bonding the rollers to a strip and wrapping the strip about the crankpin and moving the connecting rod 11 and associated sleeve 17 over portions 21 of crankshaft 23 and into their final aligned position with the bearing race portion 25 to trap the rollers 27 therebetween. Further assembly such as passing a piston wrist pin through the bearing 19 and assembling the crank connecting rod and piston within an engine housing may occur at any convenient time in the assembly process.

Positioning the rollers 27 about crankshaft 23 and thereafter aligning the sleeve and crankshaft traps the rollers between sleeve 17 and inner bearing race 25. The sleeve 17 has an inner surface 29 which forms the outer bearing race and the cylindrical surface 25 of crankshaft 23 forms an inner bearing race with the cylindrical surface of the inner bearing race 25 being generally parallel to and displaced from the crankshaft axis of rotation 31 further journalling of the crankshaft 23 may occur in any conventional manner. Crankshaft 23 includes the enlarged crankshaft portions or shoulders 33 and 35 which trap the rollers 27 in an axial direction while the sleeve 17 confines those rollers radially inwardly and the inner bearing race 25 confines rollers 27 radially outwardly. So long as no further substantial axial movement between the sleeve 17 and cylindrical surface 25 occurs, the rollers 27 will remain trapped therebetween. The piston pin bosses restrain the axial movement of the rod after engine assembly. Surfaces 25 and 29 are typically hardened.

The cost of the aluminum connecting rod 11 and steel liner 17 with the opening 13 bored and the liner 17 positioned therein is about the same as the cost of a stamped connecting rod blank before the hardening and grinding which is required with such stamped steel connecting rods and therefore the cost of these two steps is totally eliminated by the present invention. The mass of such a steel connecting rod is about two and one-half times the mass of the aluminum connecting rod 11 and that mass reduction also results in a reduction of the mass of the crankshaft counterweight 37 thereby reducing the shaking forces in the engine.

In summary, then, an improved connecting rod arrangement of reduced mass and cost as well as improvements in connecting rod and crankshaft assembly techniques have been disclosed meeting the objects and advantageous features set out hereinbefore as well as others and it will be apparent that modifications as to the precise configurations, shapes and details may be made by those having ordinary skill in the art without departing from the spirit of the invention or the scope thereof as set out by the claims which follow.

What is claimed is:

1. The method of fabricating and assembling a connecting rod for coupling a crankshaft and piston comprising:
    casting an aluminum connecting rod blank having an opening near each end thereof;
    machining one of the openings to a preferred size;
    pressing a sleeve into the machined opening for frictional engagement with said rod, said sleeve having an inner surface;
    forming a crankshaft having two shoulders on the offset crankpin portion thereof for defining a race portion therebetween;
    machining said race portion;
    wrapping a strip of rollers about said machined race portion; and
    passing the sleeve over the crankshaft and the rollers for concentric alignment with the rollers and race portion;
    whereby the rollers are confined by the race portion of the crankshaft, the inner surface of the sleeve and the shoulders of the crankshaft.

2. The method of claim 1 wherein the inner surface of the sleeve forms an outer bearing race and the race portion of the crankshaft comprises a cylindrical surface generally parallel to and displaced from the crankshaft axis of rotation and forms an inner bearing race with shoulders at the ends thereof.

3. The method of claim 2 including the further step of precluding roller removal by preventing substantial axial movement between the sleeve and cylindrical surface by restraining movement of the rod in the axial direction of the crankshaft.

4. The method of claim 1 wherein the strip of rollers is bonded with wax.

5. The method of claim 1 wherein the sleeve has only one outwardly formed flange thereon adjacent a counterweight on said crankshaft.

* * * * *